May 11, 1965 D. V. TINDER ETAL 3,182,525
POWER ACTUATOR WITH HARMONIC DRIVE
Filed March 28, 1962 2 Sheets-Sheet 2

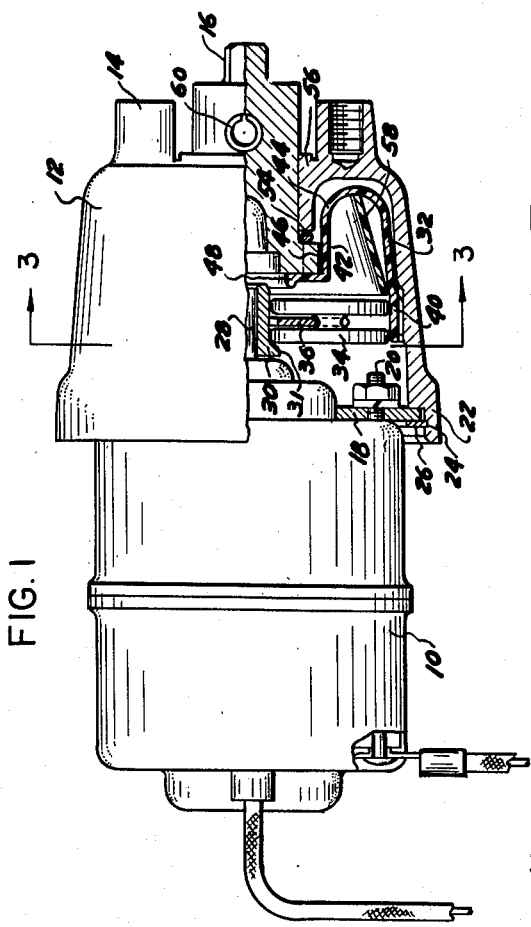
INVENTOR.
DAVID V. TINDER
WILLIAM R. CAREY
BY
ATTORNEY

INVENTOR.
DAVID V. TINDER
WILLIAM R. CAREY
BY
ATTORNEY

United States Patent Office 3,182,525
Patented May 11, 1965

3,182,525
POWER ACTUATOR WITH HARMONIC DRIVE
David V. Tinder, Detroit, and William R. Carey, Taylor, Mich., assignors to Dura Corporation, Oak Park, Mich., a corporation of Michigan
Filed Mar. 28, 1962, Ser. No. 183,303
8 Claims. (Cl. 74—640)

This invention relates to a gearing system and in particular to a speed reducing gearing system embodying a so-called "strain gear" or "flex spline," which is deformed at a plurality of points for the purpose of engaging it with a mating gear mounted coaxially therewith and in circumferential relationship thereto.

It is the principal object of the invention to provide a compact gear reduction unit which is capable of relatively high reduction ratios, in the order of from 100 to 1, to 1000 to 1, without the use of countershafts, worm gears, or the like, and in which the strain gear is of such design that it may be molded or cast of plastic material.

The need for compact electrically powered actuators of small size and of low cost exists in many fields of industry. Small, cheap electric motors have been available for some years, but these small motors are invariably of the high speed type with output shaft speeds of 3,000 to 15,000 r.p.m., which renders them unsuitable for use in many installations without reduction gearing, and conventional gearing of the required ratio is costly, bulky and of low efficiency.

The present invention provides a low cost, compact, power actuator of high efficiency with simple gearing and with the output shaft disposed in axial alignment with the motor shaft.

In the drawings which accompany this description, I have illustrated two preferred forms of the invention.

FIG. 1 is an elevation, partly in section, showing one form of the invention which embodies a standard electric motor with the novel gear box attached to the output end thereof.

FIG. 2 is an end view of the assembly as viewed from the right end thereof.

FIG. 3 is a vertical section taken on the line 3—3 of FIGS 1 and 4.

Figure 4:
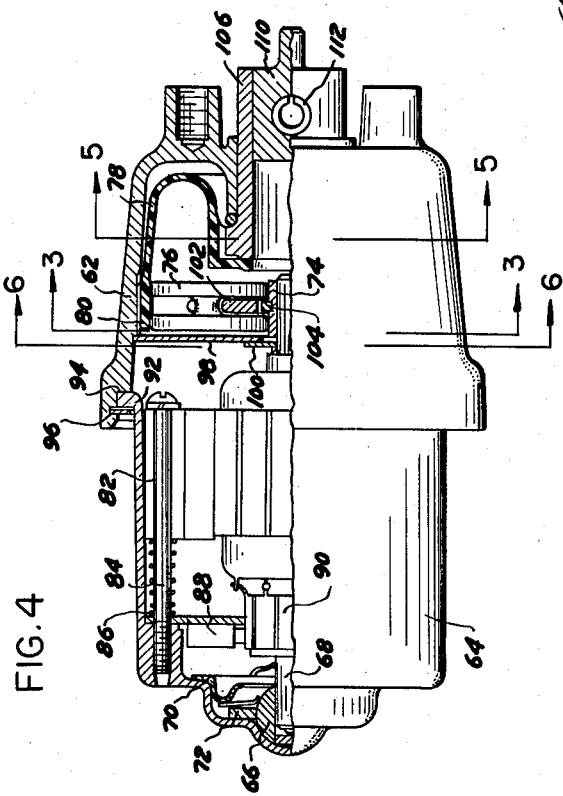
FIG. 4 is an elevation, partly in section, of a modified form of the invention wherein a separate motor housing is dispensed with and one less bearing is used in the assembly.
Figure 5:
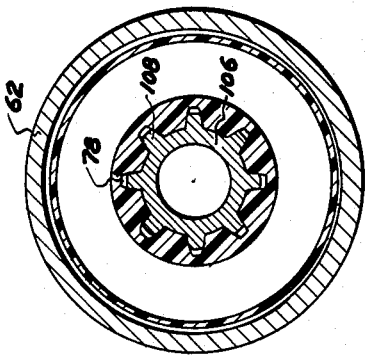
Figure 6:
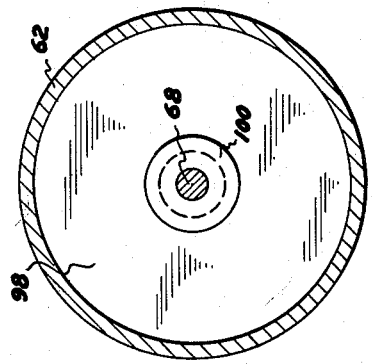

FIGS. 5 and 6 are sectional views taken respectively on the lines 5—5 and 6—6 of FIG. 4.

Referring now to FIGS. 1 to 3, it will be seen that the power unit comprises an electric motor 10 having a gearbox housing 12 secured to the output end thereof. The housing 12 encloses the reduction gearing and is provided with mounting bosses 14 disposed in surrounding relation to the output shaft 16.

The housing 12 is attached to the motor housing by means of a plate 18, which is preferably of plastic material such as Delrin, said plate being fastened to the output end of the motor shell by the mounting bolts 20 which are conventionally supplied. The housing 12 is provided with an enlarged flanged portion 22 which fits over the plate 18 and engages the latter with slight radial clearance thereby permitting the gear system to align itself as will be further explained. A groove 24 machined in the interior periphery of the housing bell 12 receives a split ring 26 which snugly engages the plate 18 and thus secures the gearbox assembly on the motor housing while permitting ready disassembly if necessary.

The output shaft 28 of the electric motor carries a frictional driving element 30 which constitutes the sun element of a frictional planetary driving system, the member 32 being the ring element thereof and the friction rollers 34 constituting the planet elements thereof. The rollers 34, in this instance three in number, are of barbell shape and are rotatably mounted on a carrier 36 which consists of a disc having slots 38 disposed 120 degrees apart for receiving the axle portions of the rollers. The rollers 34 engage the ring element 32 along the inner marginal edge of its outer cylindrical portion 40 as shown in FIGS. 1 and 3.

The frictional driving element 30 has a peripheral shoulder 31 formed on one end which limits axial movement of the rollers 34 in that direction. If desired, the member 30 may be eliminated and the shaft 28 may engage the rollers directly.

The element 32 constitutes the output member of the gearing system and is the "strain gear" or "flex spline" of the combination. It is constructed preferably of tough, durable plastic material such as, for example, that known by the trade name "Delrin," and is of cup-shape in section with a reentrant hub portion 42. The hub portion is provided with splines 46 which mate with spline teeth on the inner enlarged portion of the output shaft 16. An axial flange 48 engages the inner end of the shaft 16 and assists in maintaining assembly of the parts.

The outer cylindrical portion 40 of the element 32 is provided with teeth 50 which are of the same circular pitch as similar teeth 52 on the inner cylindrical portion of the housing 12. The element 32 has three less teeth than the housing 12, and these teeth are formed on a proportionately smaller pitch diameter. The teeth 50 are adapted to mesh with the teeth 52 at points radially adjacent the areas of contact of the three rollers 34 with the inner surface of the portion 40 of the flex spline, the latter being flexed or distorted, as clearly shown in FIG. 3, to accommodate this action.

The flex spline element 32 is novel in configuration and, as can be seen from the drawings, consists of two concentric cylindrical portions, the hub portion 42 and the strain gear portion 40 integrally connected by a cup-shaped diaphragm portion. During operation, the action of the rollers 34 on the strain gear portion 40 causes that portion to have both radial and tangential movement as the teeth 50 move into and out of engagement with the teeth 52. The diaphragm portion thus provides a positive torsional connection between the toothed strain gear portion 40 and the splined hub portion 42 which integrates the tangential motions of all points on the strain gear portion into continuous rotary motion at the hub 42 while at the same time attenuating the radial motions of the strain gear portion.

The diaphragm shape of the connecting portion of the element accomplishes the aforesaid results in minimum axial space and keeps the stresses imposed by the flexure and torsional loads within the capacity of the material.

The fit between the drive element 30, the rollers 34 and the flex spline portion 40 is preferably such that a substantially non-slipping frictional planetary drive is transmitted from the motor shaft 28 to the rollers 34. Thus as the rollers travel around the portion 40 in engagement therewith, the teeth 50 will be engaged and disengaged with the teeth 52 at three areas in a deflection wave which will cause the element 32 to rotate because of the difference in the number of teeth on the respective members. This rotation of the element 32 will be transmitted through the splines 46 to the output shaft 16 which thus is rotated at a speed determined by the combined reduction ratios afforded by the frictional planetary drive and the flex spline drive.

For a complete explanation of the flex spline or strain gear theory, reference is made to Musser Patent No. 2,906,143, issued September 29, 1959.

In the embodiment being described, a thrust ring 54 of Delrin or the equivalent is disposed between a bearing portion 56 in the housing 12 and the splined portion of the output shaft 16. A conically shaped spacing member 58 is inserted in the cupped portion of the element 32 which tends to maintain the latter in the position shown in FIG. 1 with the teeth and splines in full engagement. The spacer 58 also, in conjunction with the shoulder 31, maintains the rollers 34 in radial alignment with the toothed portion 40 of the element 32.

The particular actuator described is especially designed for forward and reverse rotation through an arc of somewhat less than 180°, and for this reason a stroke limiting device, shown in FIG. 2, is used. This comprises a roll pin 60 disposed through the enlarged portion of the shaft 16 of sufficient length to engage the bosses 14 at either end of the stroke of the shaft. The roll pin 60 is shown in full lines in its central position. Energization of the motor 10 for clockwise rotation of the shaft 16 will cause rotation of shaft 16 until the pin 60 engages the lugs 14 as shown by the broken lines. Correspondingly, energization of the motor for rotation in the opposite direction will cause reverse rotation of shaft 16. Removal of the roll pin 60 will permit unlimited rotation of shaft 16 in either direction.

While the element 32, which consists of the inner and outer toothed portions 40, 42, joined by the annular cupped web portion 44, is preferably fabricated or molded from plastic material, this has been specified for reasons of economy, and metal of sufficient flexibility may be used where desired. During operation of the gearing system, flexure of the portion 40 in response to travel of the rollers 34 around the inner surface thereof produces some slight sliding movement of the toothed portion 42 relative to the spline 46. The flange 48 and the spacer 58 cooperate to maintain the parts in assembled relation yet permit sufficient movement to provide a quiet and somewhat flexible transmission of power.

It thus will be seen that the described device provides a high reduction reversible drive between the motor shaft 28 and the output shaft 16, the flex spline 32 being advanced in the direction of drive rotation at a rate determined by the difference in the number of teeth 50 and 52. In the particular example illustrated, the speed reduction is approximately 450 to 1 with a drive efficiency in the operating range approaching 60%. Small power actuators for similar uses now employed with conventional gearing usually attain a drive efficiency of from 20% to 25%. This great improvement in efficiency is an extremely important feature of the device.

The modification shown in FIG. 4 differs essentially from that of FIG. 1 only in that the standard motor casing with its bearings has been eliminated and the motor and gear system is built up as a unitary assembly with the bearing provided by the friction rollers serving as one bearing for the motor armature. This arrangement eliminates certain alignment problems and is considerably cheaper in construction.

As can be seen from FIGS. 4, 5 and 6, a two-part housing is employed, the portion 62 being similar to the housing 12 of FIG. 1. The other housing portion 64 is preferably of die cast construction and has a chamber in its closed end for receiving a self-aligning ball thrust bearing 66 which, in turn, receives and supports one end of the motor armature shaft 68. The bearing is permanently lubricated and is retained in place by means of a conventional bearing cage 70 and felt washer 72.

The opposite end of the armature shaft carries the frictional driving element 74, and the friction rollers 76 bear on the element 74 and engage the inner marginal surface of the flex spline 78, the externally disposed teeth of which are engaged with the internal teeth 80 of the housing portion 62. These parts have a tight working fit such that the armature shaft is firmly supported and this support, in connection with the self-aligning bearing 66, provides an extremely satisfactory and economical construction.

The motor field structure 82 is secured in the housing portion 64 by means of bolts 84 and spacing springs 86, the latter also serving to retain the brushes 88 in correct relationship with the commutator 90.

The housing portion 64 is provided with an integral outwardly turned flange 92 which is adapted to be snugly received against the shoulder 94 formed in the housing portion 62. A split ring 96 is fitted into a suitable groove in the portion 62 such that the two housing portions are secured together in leakproof relationship. Because of the self-aligning feature of the driving elements just described, it is not necessary to allow for any self-aligning movement of the housings.

A Belleville spring type sealing member 98 is fitted against a suitable shoulder on the inner surface of housing portion 62. The central portion of the member engages a washer 100 carried by the armature shaft as illustrated, the inherent spring of the member 98 serving to retain the parts in place and provide a seal which prevents lubricant from the gearing from entering the motor section.

The carrier 102 in this form of the invention is retained in axial position on the drive member 74 by means of a ring 104 which fits in a groove in the member 74 and extends radially between the rollers as shown. This construction renders unnecessary the use of a spacer like 58 (FIG. 1).

The output shaft comprises a tube 106 having the spline teeth 108 formed on the inner end thereof where they mate with the internal spline on the flex spline member 78 (FIG. 5). A plug 110 secured to the tube by means of the roll pin 112 closes the end of the tube.

The operation of this modification is identical to that shown in FIG. 1.

I claim:
1. A gearing system comprising,
   an annular housing having gear teeth formed integrally on the inner wall thereof,
   a pair of driveshafts mounted coaxially in said housing,
   a flex spline member drivingly mounted on the inner end of one of said shafts,
   said flex spline member comprising a pair of concentrically disposed radially spaced cylindrical portions, said cylindrical portions being interconnected at one end thereof by a semi-toroidal flexible web member,
   the outer surface of the outer cylindrical portion having integral teeth on a smaller pitch diameter than the gear teeth in said housing disposed in radial alignment with the gear teeth in said housing,
   a strain inducing element drivingly carried by the other of said shafts and disposed in engagement with the inner surface of said outer cylindrical portion such that said outer cylindrical portion is deflected at a plurality of spaced points sufficiently to engage the teeth of said flex spline member with said housing teeth.

2. The combination set forth in claim 1 wherein the inner cylindrical portion of said flex spline member has a spline connection with said one driveshaft.

3. The combination set forth in claim 1 wherein said flex spline member consists of a molded plastic element.

4. The combination set forth in claim 1 wherein said strain inducing element comprises a disc carried by said other shaft having a plurality of slots, rollers of barbell shape disposed in said slots and spacer means carried by said other shaft for limiting axial movement of said disc and rollers.

5. An electrically powered rotary actuator comprising:
   a housing,
   an electric motor mounted in said housing,
   a drive shaft disposed in said housing to be driven by said motor, an output shaft journaled in said housing in coaxial relationship with said drive shaft, a flex spline member, said flex spline member comprising a pair of concentrically disposed radially spaced toothed cylindrical portions, said cylindrical portions being interconnected at one end thereof by a semi-toroidal flexible web member, a splined driving connection between said inner cylindrical member and said output shaft, spline teeth formed on the inner surface of said housing in radially spaced alignment with the outer surface of said outer cylindrical member, spline teeth on the outer surface of said outer cylindrical member radially aligned with said housing teeth, a plurality of circumferentially spaced rollers carried by said drive shaft in driving engagement therewith, said rollers being disposed in engagement with the inner surface of said outer cylindrical member at spaced points in such manner that said outer cylindrical member is deflected at said points of engagement sufficiently to engage the teeth on said outer cylindrical member with the housing teeth, whereby as said drive shaft is rotated the outer cylindrical member is radially deflected to propagate a wave and successive tooth engagement.

6. The combination set forth in claim 5 wherein said motor is mounted in the housing by means permitting limited radial movement of the motor relatively of the housing whereby the axial alignment of the motor driven shaft is determined by said rollers.

7. A flex spline element for use in a strain wave gearing system which comprises a pair of concentrically disposed, radially spaced toothed, cylindrical portions, said cylindrical portions being interconnected at one end thereof by a semi-toroidal flexible web member.

8. The combination set forth in claim 1 wherein the axial length of said flex spline member is less than twice the diameter of the output drive shaft.

References Cited by the Examiner
UNITED STATES PATENTS

| 1,752,542 | 4/30 | Raule | 74—798 |
| 2,900,831 | 8/59 | Wilson et al. | 74—411 |
| 2,932,992 | 4/60 | Larsh | 74—443 |
| 2,943,465 | 7/60 | Musser | 74—640 |
| 2,983,162 | 5/61 | Musser | 74—640 |

FOREIGN PATENTS

| 503,046 | 5/51 | Belgium. |

DON A. WAITE, *Primary Examiner.*